United States Patent [19]
Lalor

[11] 3,822,656
[45] July 9, 1974

[54] SUBSOIL AMENDMENT MATERIAL INCORPORATING METHOD AND APPARATUS

[76] Inventor: William F. Lalor, 4505 Creedmoor Rd., Raleigh, N.C. 27612

[22] Filed: July 7, 1972

[21] Appl. No.: 269,882

[52] U.S. Cl.................... 111/14, 111/76, 172/63
[51] Int. Cl. ............................................. A01c 5/00
[58] Field of Search ............... 111/1, 14, 73, 80, 85, 111/87, 76, 63, 10; 172/63, 65, 66

[56] References Cited
UNITED STATES PATENTS
| | | | |
|---|---|---|---|
| 1,085,508 | 1/1914 | Talbot et al. | 172/63 |
| 1,613,411 | 1/1927 | Ray | 111/76 |
| 2,990,186 | 6/1961 | Gandrud | 111/10 X |
| 3,398,707 | 8/1968 | McClenny | 111/1 |
| 3,698,485 | 10/1972 | Trimpo et al. | 172/65 |

*Primary Examiner*—Stephen C. Pellegrino
*Attorney, Agent, or Firm*—Robert S. Swecker

[57] ABSTRACT

Method and apparatus for preparing the soil prior to seed planting. The apparatus is preferably drawn by a tractor and includes a plow which turns the topsoil to expose the subsoil as the apparatus advances. Dispensing apparatus conducts soil amendment material from a hopper through a plurality of tubes to a box behind the plow. The box has discharge outlets which are arranged across a substantial width of the furrow formed by the plow. A rotary tiller is positioned behind the box and mixes the amendment material into the subsoil to a depth greater than the plow.

10 Claims, 7 Drawing Figures

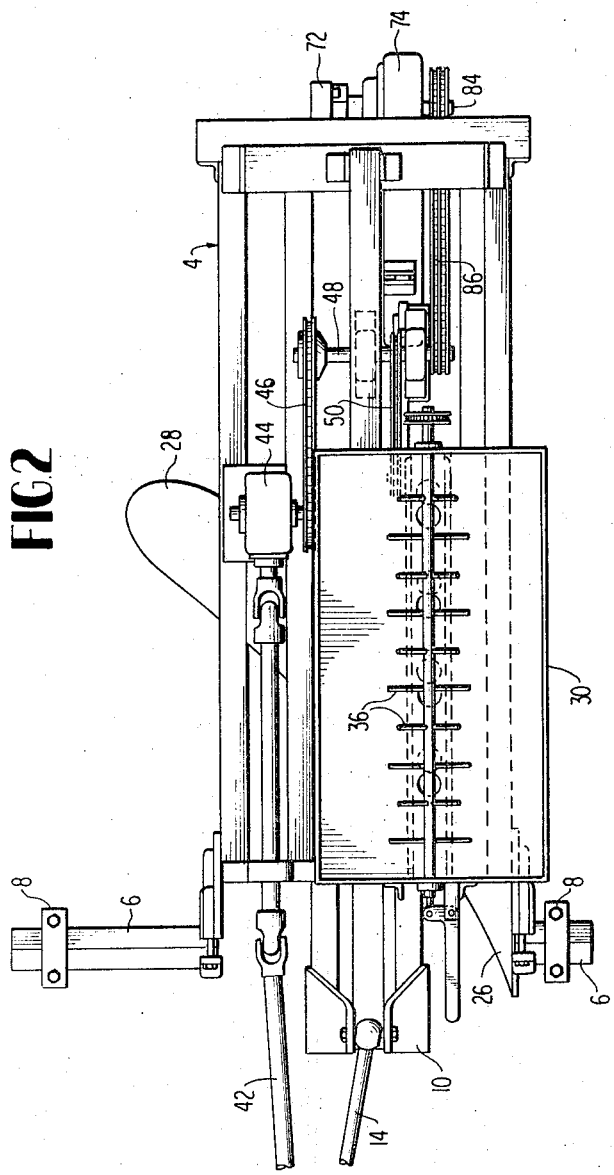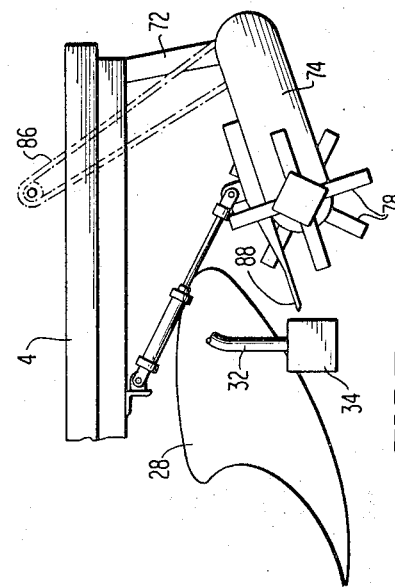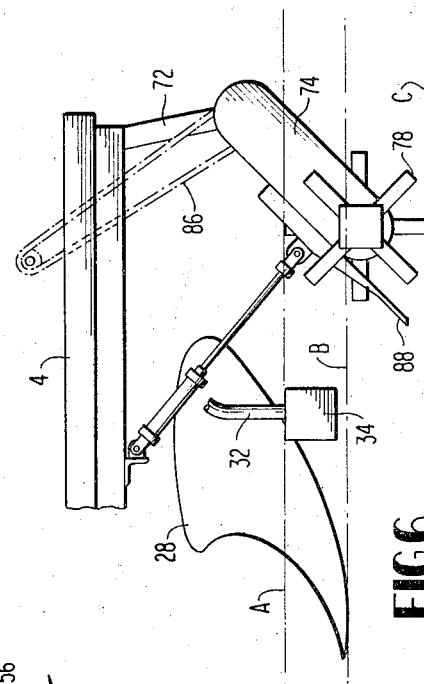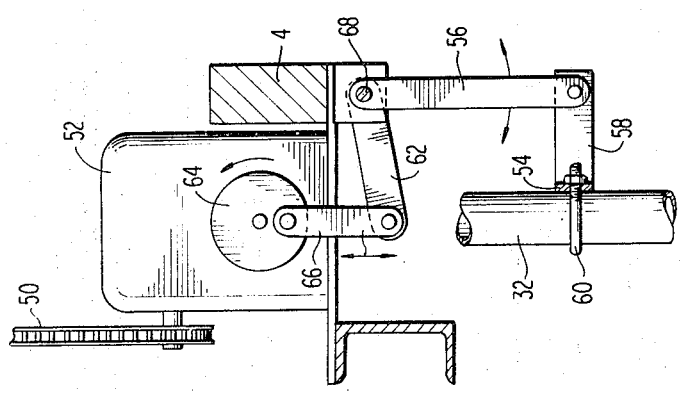

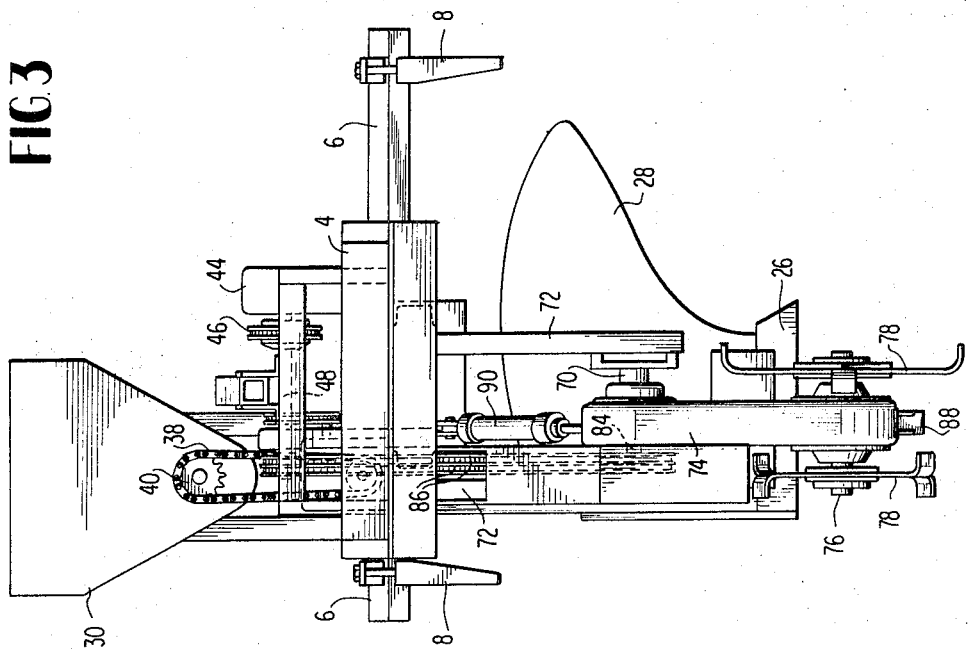
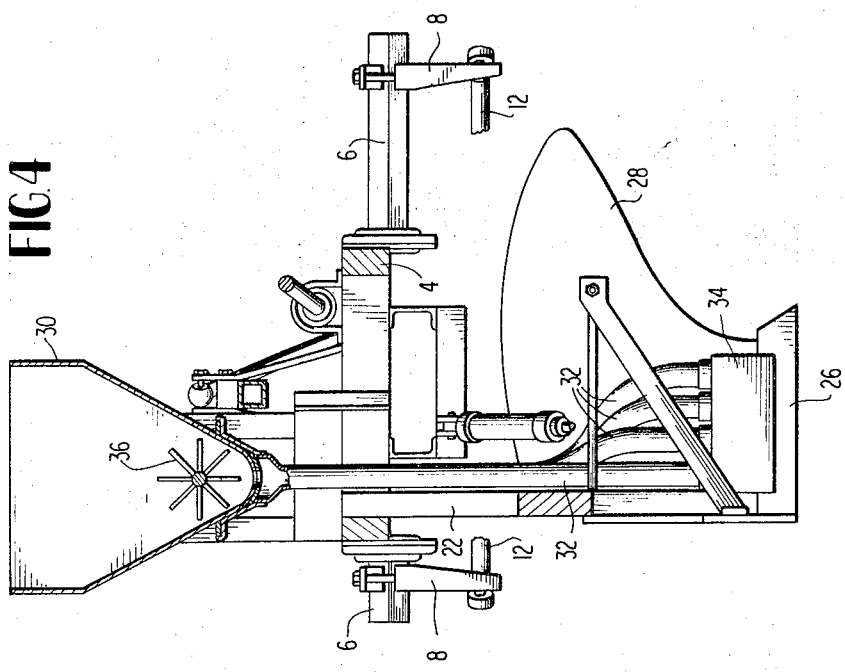

SUBSOIL AMENDMENT MATERIAL INCORPORATING METHOD AND APPARATUS

BACKGROUND OF THE INVENTION

This invention relates to agricultural methods and implements, and more particularly, to methods and apparatus for incorporating amendment materials into the subsoil.

An important factor controlling the growth of crops is the condition of the soil in which the plants grow. The root system of a plant, such as a cotton plant, may extend to a depth of as much as thirty inches. In order to improve the condition of the soil, amendment materials, such as fertilizer and limestone are incorporated into the soil prior to planting.

It is a common practice to plow a field and then to break up the soil with a harrow. Fertilizer, limestone, or other amendment materials may be applied to the soil either before or after plowing. Some amendment materials, particularly limestone, wash into the soil at a very slow rate. Often, the subsoil requires a different rate of application of amendment materials than does the topsoil, and often different amendment materials are required for the subsoil than for the topsoil.

Prior attempts to achieve greater penetration of amendment materials by plowing deeper furrows have been generally unsuccessful because the power required to pull the plows increases as the depth of the plow increases, and there is a practical limit at which plowing can be carried out, depending upon the type of soil that is being plowed.

One disadvantage of conventional methods and apparatus for distributing amendment materials is that subsequent working of the soil may cause the material to be unevenly distributed in the soil. In order to obtain the beneficial results of soil amendment materials, the materials should be distributed uniformly in the soil. If limestone, for example, is added to lower the acidity of the soil, the pH value will change to a greater degree at places in the soil where the limestone is more concentrated than it will change in the areas where the limestone is less concentrated.

SUMMARY OF THE INVENTION

It is an object of this invention to provide improved methods and apparatus for incorporating amendment materials in the soil, particularly in the subsoil.

Another object of this invention is to provide a method and apparatus for incorporating amendment materials uniformly at a predetermined depth, preferably in the layer underlying the topsoil.

It is a further object of this invention to provide a method and apparatus for incorporating amendment materials in the subsoil by utilizing apparatus which is capable of being drawn by conventional tractors.

These objects are accomplished in accordance with a preferred embodiment of the invention by apparatus which is supported on a tractor to be drawn through the field. The apparatus includes a mouldboard plow which is capable of plowing to the depth of the top layer of the subsoil. Amendment material distributing apparatus conducts the material through a plurality of tubes to a box behind the plow bottom. The material passes out of the box through openings spaced apart laterally of the plow to deposit the material uniformly across substantially the entire width of the furrow. A rotary tiller is suspended behind the plow and is capable of being lowered to a depth greater than the depth of the plow. A tine on the tiller engages the soil in front of the tiller to cut a trough in the subsoil for passage of the tiller and to ensure that the operating depth of the tiller is maintained.

As the tractor advances, the plow, which is adjusted to the depth of the topsoil, moves the topsoil to expose the top layer of the subsoil at the bottom of the furrow. The soil amendment material is distributed uniformly across the bottom of the furrow as the plow advances, and the tiller, which also advances with the plow, cultivates the subsoil at a depth greater than the depth of the plow, thereby thoroughly mixing the amendment material into the subsoil.

DETAILED DESCRIPTION OF THE DRAWINGS

This preferred embodiment of the invention is illustrated in the accompanying drawings in which:

FIG. 2 is a top plan view of the apparatus of FIG. 1;

FIG. 3 is an end elevational view of the incorporating apparatus of FIG. 1;

FIG. 4 is a cross-sectional view of the apparatus along the line 4—4 in FIG. 1;

FIG. 5 is a detailed cross-sectional view along the line 5—5 in FIG. 1 showing the duct shaker mechanism;

FIG. 6 is a side elevational schematic view of the apparatus showing the tiller assembly in a lowered position; and FIG. 7 is a side elevational schematic view of the apparatus showing the tiller assembly in a raised position.

DETAILED DESCRIPTION OF THE PREFERRED EMBODIMENT

Figure 1:
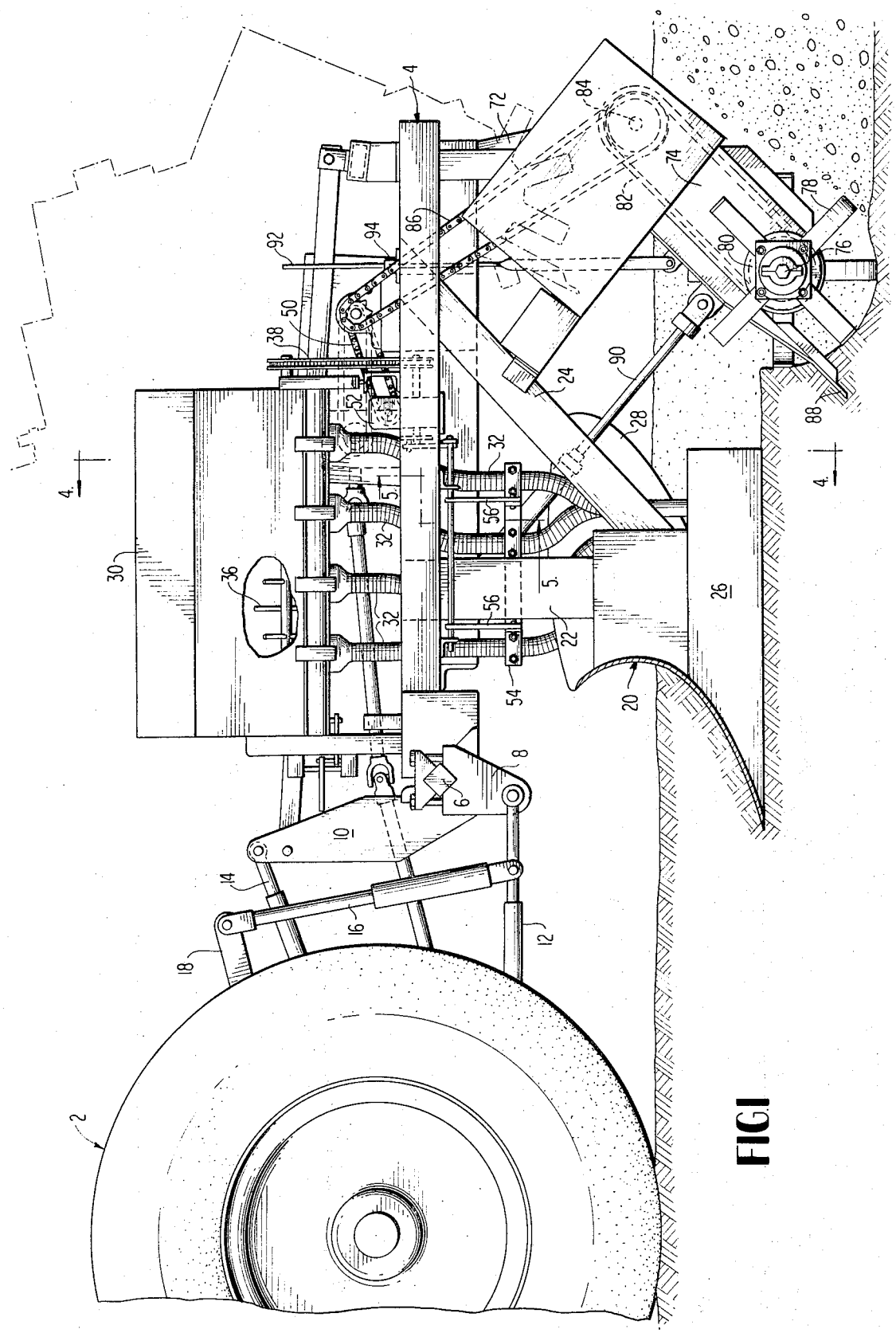
FIG. 1 is a side elevational view of the amendment incorporating apparatus of this invention.

As shown in FIGS. 1 to 4, the apparatus of this invention is supported at the rear of a tractor 2. The apparatus includes a rectangular frame 4 with laterally projecting bars 6 at the forward end of the frame 4. Brackets 8 on the bars 6 cooperate with a central bracket 10 to provide a conventional three point hitch. A pair of lower arms 12 and an upper ram 14 connect the brackets 8 and 10, respectively, with the frame of the tractor 2. A ram 16 extends between a support arm 18 on the tractor and the lower arms 12 to raise and lower the frame 4. The arms 12 and ram 14 cooperate to maintain the frame 4 horizontal while the apparatus is in operation, and to tilt the apparatus upwardly to the position shown in dotted lines in FIG. 1 when the apparatus is not in use.

A plow 20 is rigidly secured to the frame 4 by a column member 22 and a support member 24. The plow 20 includes a plow bottom 26 which, as shown in FIG. 4, has a substantial width. The plow also has a large mouldboard 28. Preferably, the plow is suitable for plowing a furrow that is as deep as 18 inches and as wide as 18 inches. The depth of the plow bottom 26 is controlled by the position of the conventional three point hitch system of the tractor.

A hopper 30 is supported on the frame 4 for temporarily storing amendment materials before they are discharged into the soil. A plurality of tubes or ducts 32 extend downwardly from the bottom of the hopper 30. A distributor box 34 is rigidly mounted on the plow behind the mouldboard 28 and plow bottom 26. The ducts 32 are secured in the top of the box 34 and are uniformly spaced along the width of the box, as shown in FIG. 4. A plurality of holes are provided in the bottom of the box throughout substantially the entire width of the box to allow distribution of the amendment material throughout at least a majority of the width of the bottom of the furrow formed by the plow bottom 26.

A rotary agitator 36 is mounted in the hopper 30 and is driven by a chain 38 which engages a sprocket wheel 40 on the end of the agitator shaft (FIG. 3). Power for driving the chain 38 is provided from the power takeoff on the tractor through a drive shaft 42 (FIG. 2) which is connected with a right angle gear box 44 on the frame 4. A drive chain 46 transmits power from the gear box 44 to a countershaft 48. A sprocket chain 50 extends between the countershaft 48 and a speed reducer 52 on the frame 4. The drive chain 38 is driven by the output shaft of the speed reducer 52, as shown in FIG. 1.

The output shaft of the speed reducer 52 also drives a shaker which prevents clogging of the ducts 32. As shown in FIGS. 1 and 5, a straight bar 54 is pivotally suspended from the frame 4 by a pair of arms 56. The lower end of each arm 56 is pivotally connected with a mounting bracket 58 which extends outwardly from the bar 54. The ducts 32 are secured to the bar 54 by clamps 60.

The shaking motion of the bar 54 is produced by oscillating motion of a crank arm 62 which is connected with a crank 64 on the output shaft of the speed reducer 52 by a link 66. As the crank 64 rotates in the direction of the arrow shown in FIG. 5, the link 66 reciprocates generally in the direction of the arrows adjacent the link 66. Since the crank arm 62 and the arm 56 are rigidly connected to the pin 68, an oscillating motion is transmitted from the arm 56 through the bracket 58 to the ducts 32.

At the rear of the frame 4, a transverse shaft 70 extends outwardly from a support member 72 which is rigidly secured to the frame 4. A case 74 is supported at one end on the shaft 70 in suitable bearings which allow the case to pivot about the shaft 70. At the lower end of the case, a transverse shaft 76 is mounted in bearings for rotation. Rotary tiller blades 78 are secured on each end of the shaft 76. In the interior of the case 74, a sprocket wheel 80 is mounted on the shaft 76 and a chain 82 transmits power from a countershaft 84 to the shaft 76 for rotating the tiller blades 78. The countershaft 84 is driven by chains 86 from the countershaft 48.

A tine 88 is secured on the case 74 and projects forwardly of the tiller blades 78. The tine 88 is aligned with the center of the case 74, as shown in FIG. 3. The rotary tiller blades 78 may be raised and lowered by means of a hydraulic ram 90 which is connected between the frame 4 and the lower end of the case 74. When the ram 90 is extended, the rotary tiller blades 78 are positioned at a depth greater than the plow bottom 26 to allow tilling of the subsoil. Preferably, the tiller blades 78 are adjustable to till the soil at a depth of up to 30 inches below the unplowed surface of the ground. The tiller blades may preferably reach a depth of up to 12 inches below the plow bottom 26. In swinging from the lowered position as shown in FIG. 1 to the raised position as shown in FIG. 7, the case 74 pivots about the shaft 70 (FIG. 3).

In operation, the frame 4 is lowered to the position shown in FIG. 1 by pivoting the bracket 10 by means of the ram 14. The depth of the plow is preferably adjusted to assure turning the topsoil and exposing the top layer of subsoil at the bottom of the furrow. The depth of the rotary tiller blades is adjusted by means of the hydraulic ram 90 to the desired depth below the plow bottom. The hopper 30 is filled with soil amendment material, such as lime. Rotary power is supplied to the apparatus by the shaft 42 which is driven by the power takeoff of the tractor. The agitator 36 prevents agglomeration of the material in the hopper and assures an even flow of lime into the ducts 32. The shaker device prevents clogging of the of the material as it flows downwardly to the distributor box 34 adjacent the plow bottom 26. The holes in the bottom of the box 34 are sufficiently large to avoid clogging and the vibration of the apparatus as the plow advances causes the material to flow freely from the box 34, where it is deposited on the top layer of subsoil at the bottom of the furrow. As the tractor advances, a furrow is cut by the plow and the rotary tiller breaks up the subsoil to cause thorough mixing of the lime with the subsoil, leaving behind cultivated subsoil that includes a uniform distribution of lime.

As the apparatus advances, the tine 88 imposes a downward force on the case 74 which tends to maintain the rotary tiller blades 78 at the depth selected. A depth indicator rod 92 is connected at its lower end with the case 74 and supported for reciprocating movement in a guide 94 on the frame 4. The rod 92 is visible to the operator on the tractor, so that he can determine whether the rotary tiller is operating at the desired depth.

The tine 88 also serves the purpose of clearing a path for the lower end of the case 74 as it advances through the subsoil. The tiller blades 78 pass sufficiently close to the tine to assure that the subsoil is broken up and will not interfere with the movement of the case 74.

In carrying out the method of this invention, a wide furrow is formed progressively as the plow advances through the soil. The plow bottom is set at a depth to expose the top layer of subsoil. The topsoil passes along the mouldboard 28 and is turned over at the side of the furrow. The level of the unplowed ground is indicated schematically in FIG. 6 by the horizontal line A. The top layer of subsoil is indicated by the horizontal line B. The amendment material, such as lime, is deposited on the top layer of subsoil from the distributor box 34 throughout substantially the entire width of the furrow. The rotary tiller blades 78 project into the subsoil to a depth indicated by the horizontal line C in FIG. 6 to break up the subsoil and to mix the lime thoroughly in the subsoil. When the next furrow is plowed, the topsoil covers the subsoil in the previous furrow. As a result of using this method, the condition, especially the pH value of the soil may be altered without significantly changing the condition of the topsoil.

By employing a rotary tiller, in combination with a plow, the soil may be cultivated to a depth of as much as thirty inches without imposing excessive drag forces on the tractor. Since the apparatus carries out the plowing amendment material distribution and tilling with a single unit, it is necessary to traverse the field only once for each furrow. This permits the operation to be carried out quickly and efficiently. At the end of each furrow, the operator can easily turn the tractor by raising the apparatus to the position shown in dotted lines in FIG. 1. The distribution apparatus supplies amendment materials directly to the top layer of subsoil without the danger of clogging or uneven distribution.

While this invention has been illustrated and described in accordance with a preferred embodiment, it is recognized that variations and changes may be made therein without departing from the invention as set forth in the claims.

What is claimed is:

1. Apparatus for tilling soil comprising:
    a frame adapted to be drawn by a tractor;
    a moldboard plow attached to said frame;
    a distributor chamber behind said moldboard plow for distributing material across a substantial width of the furrow formed as the moldboard plow advances through the soil;
    hopper means on said frame spaced above said chamber;
    a plurality of tubes independently interconnecting said hopper means and said chamber for conducting pulverulent material from said hopper to said chamber;
    shaker means on said frame, said shaker means including means connected with said tubes for shaking said tubes between said hopper means and said chamber to prevent clogging as material flows from said hopper to said chamber;
    rotary tiller means on said frame spaced rearwardly from said distributor chamber for mixing amendment material into the subsoil;
    means on said frame for raising and lowering said rotary tiller means relative to said plow, said tiller means being movable to a depth greater than said moldboard plow;
    whereby said plow turns the topsoil and the tiller incorporates amendment material into the topsoil.

2. In soil tilling apparatus of the type having a frame adapted to be drawn by a tractor, the apparatus including a plow on the frame, the improvement comprising:
    amendment material dispensing means on said frame,
    said dispensing means including a distributor behind the plow for distributing material across a substantial width of the furrow formed as the plow advances through the soil,
    said dispensing means including a hopper spaced above said distributor and a plurality of tubes interconnecting said hopper and said distributor,
    said distributor comprising a box having a plurality of inlet openings on the upper side thereof and a plurality of outlet openings on the lower side thereof,
    said inlet openings being spaced apart laterally of said plow and said tubes communicating with the interior of said box through said inlet openings, thereby conducting material into said box,
    rotary tiller means on said frame spaced rearwardly from said distributor for mixing amendment material into the subsoil,
    adjustment means for selectively raising and lowering said tiller means relative to said plow, said tiller means being movable to a depth greater than said plow, whereby said plow turns the topsoil and the tiller incorporates amendment material into the subsoil.

3. the apparatus according to claim 2 wherein said outlet openings are spaced apart laterally of said plow.

4. The apparatus according to claim 3 wherein said hopper extends longitudinally of said frame and has outlet openings spaced apart longitudinally of said frame, said tubes communicating with the interior of said hopper through said hopper openings.

5. Subsoil amendment incorporating apparatus comprising:
    a frame,
    means for supporting said frame on a tractor;
    a moldboard plow having a moldboard and a plow bottom, said plow being mounted on said frame in position for plowing a furrow in the topsoil as the tractor draws the frame forwardly;
    dispenser means on said frame for dispensing amendment material into the subsoil, said dispensing means including distributor means on said plow on the rear side of the plow bottom, said distributor means extending across substantially the entire width of said plow;
    an arm pivotally attached at one end thereof to said frame said arm being spaced rearwardly of said plow;
    rotary tiller means on said arm and spaced from one end, said tiller means being in alignment with said plow and having rotary tiller blades, said arm being arranged to adjust the depth of said tiller means relative to said plow upon swinging of said arm about said one end,
    power means on said frame for pivoting said arm about said one end relative to said frame; and
    tine means secured on said arm adjacent said rotary tiller means and projecting generally toward said plow to urge said arm downwardly into subsoil as the tractor draws the frame forwardly, whereby the plow turns the topsoil and the tiller blades mix subsoil with amendment material deposited in the furrow by said soil dispensing means.

6. The amendment incorporating apparatus according to claim 5 wherein said tiller blades are mounted for rotation at the opposite end of said arm, and said power means comprising a hydraulic cylinder secured between said frame and said arm for selectively raising and lowering said tiller blades relative to said frame.

7. The amendment incorporating apparatus according to claim 5 wherein said arm is suspended from said frame in forwardly inclined relation and said tine means comprises a tine secured on said arm adjacent the lower end of said arm, said tine extending longitudinally of said arm and projecting a distance greater than the effective radius of said tiller whereby said tine urges said arm downwardly into the subsoil as the tractor draws the frame forwardly.

8. The amendment incorporating apparatus according to claim 7 wherein said tiller means includes a bar member extending upwardly from said arm and being slidably received within a guide on said frame, said bar cooperating with said guide to provide a reading of the depth of said tiller blades in the soil.

9. The amendment incorporating apparatus according to claim 7 wherein said arm is in the form of a hollow case, and said tiller means includes a rotary shaft journalled for rotation in said case, said shaft extending transversely of said case and projecting outwardly on opposite sides of said case, said tiller blades being mounted on said shaft on opposite sides of said case, said tine being secured on said case and projecting forwardly from said case between said blades, whereby said tine and said blades break up said subsoil to allow said case to move forwardly through the subsoil.

10. The amendment incorporating apparatus according to claim 9 including drive means on said frame for transmitting rotation power from the tractor to said tiller blades, said drive means including drive chains enclosed in said case.

* * * * *

UNITED STATES PATENT OFFICE
CERTIFICATE OF CORRECTION

Patent No. 3,822,656　　　　　　　　Dated July 9, 1974

Inventor(s)　　William F. Lalor

It is certified that error appears in the above-identified patent and that said Letters Patent are hereby corrected as shown below:

The name of the assignee is as follows:

COTTON, INCORPORATED, New York, N.Y.

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents